Nov. 4, 1941.   S. W. SPARKS   2,261,304
MANUFACTURE OF SHELLS FOR ORDNANCE PURPOSES
Filed Feb. 25, 1939   3 Sheets-Sheet 1
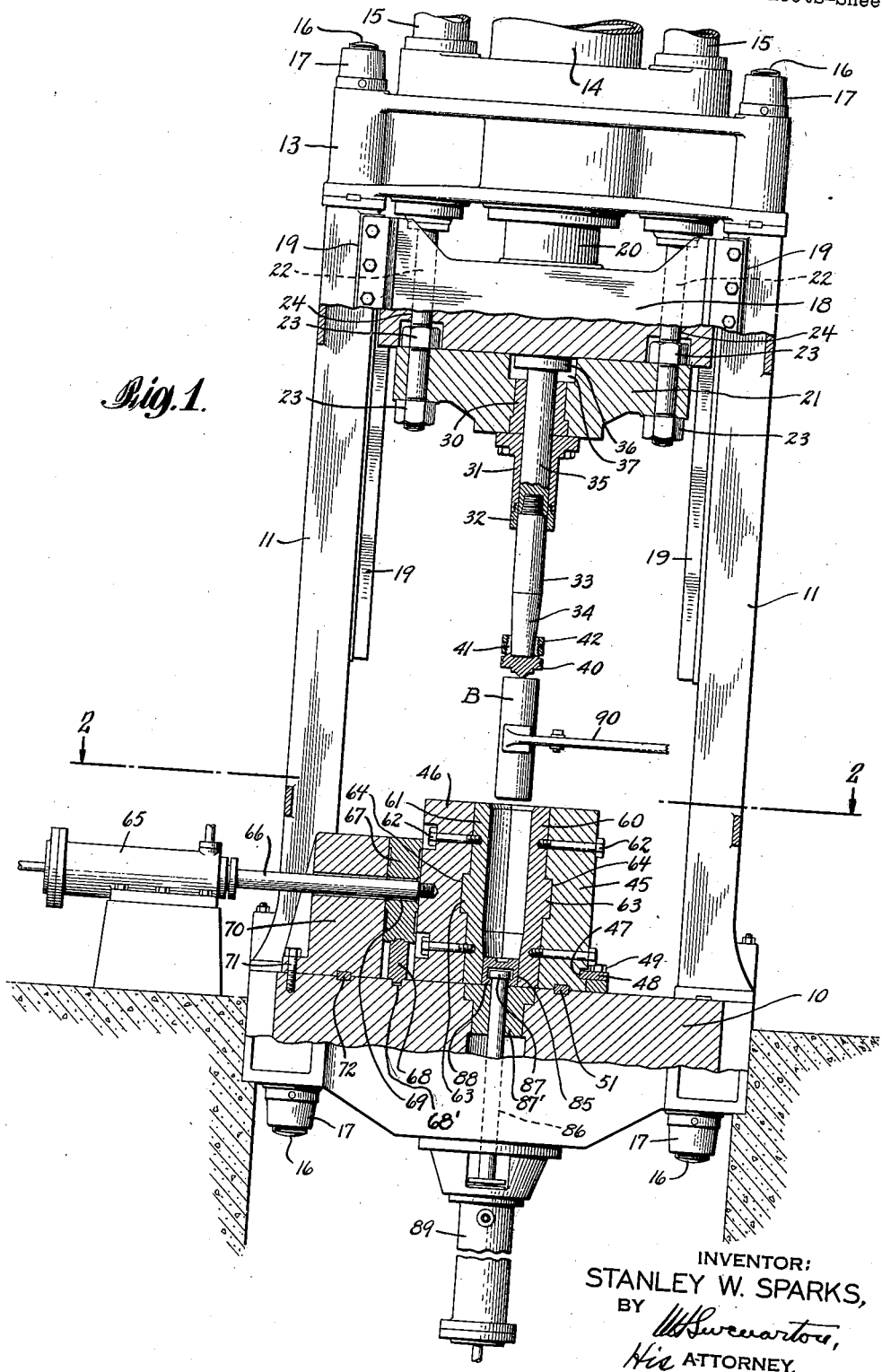
INVENTOR:
STANLEY W. SPARKS,
BY
His ATTORNEY.

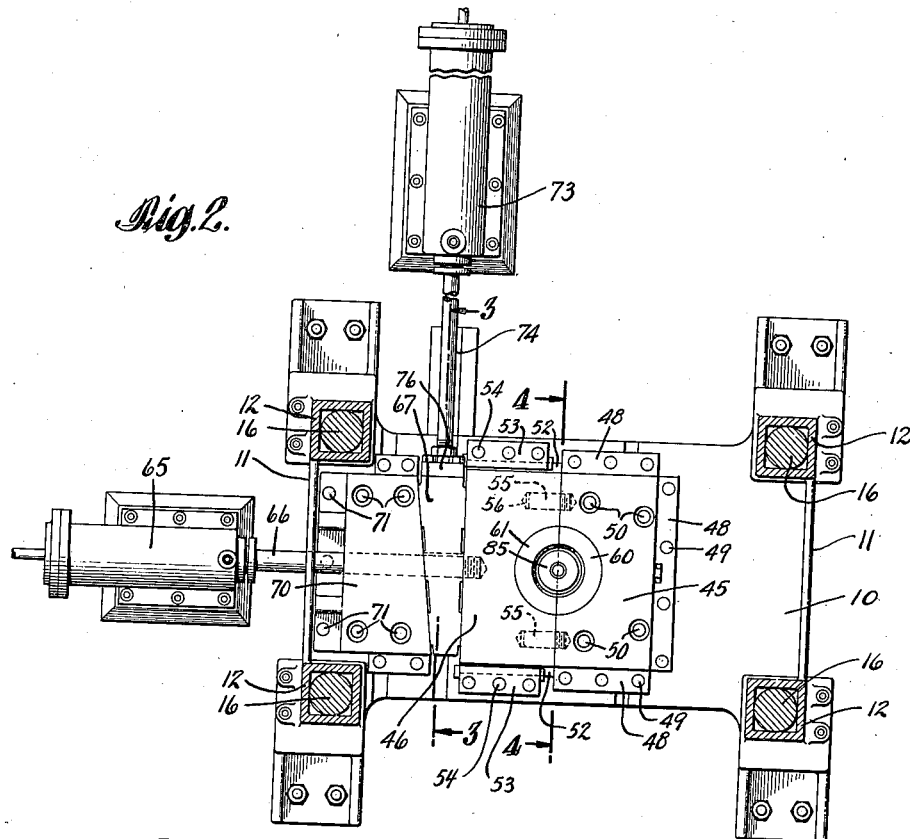
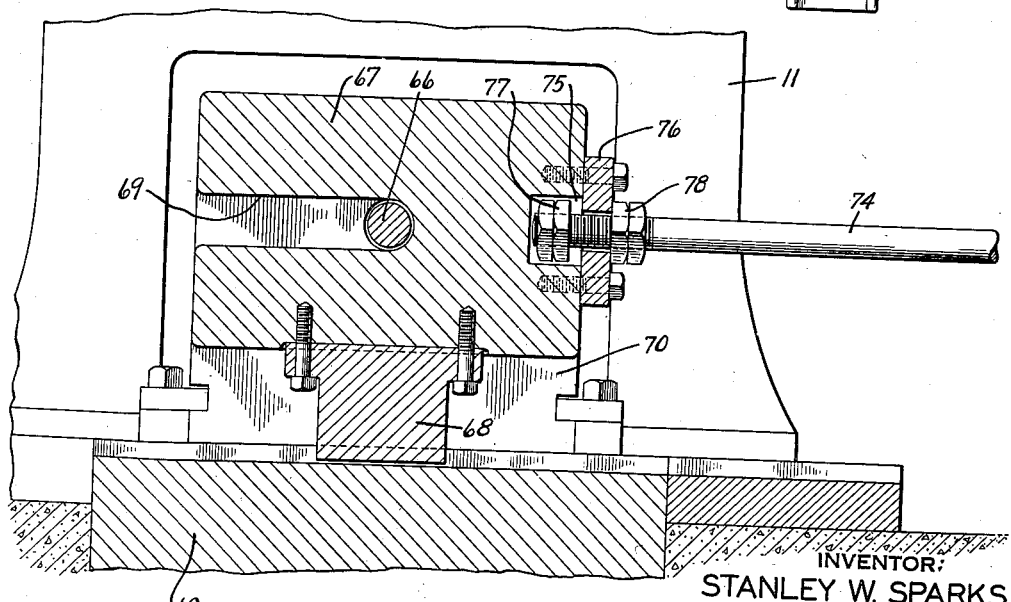

Nov. 4, 1941.    S. W. SPARKS    2,261,304
MANUFACTURE OF SHELLS FOR ORDNANCE PURPOSES
Filed Feb. 25, 1939    3 Sheets-Sheet 3
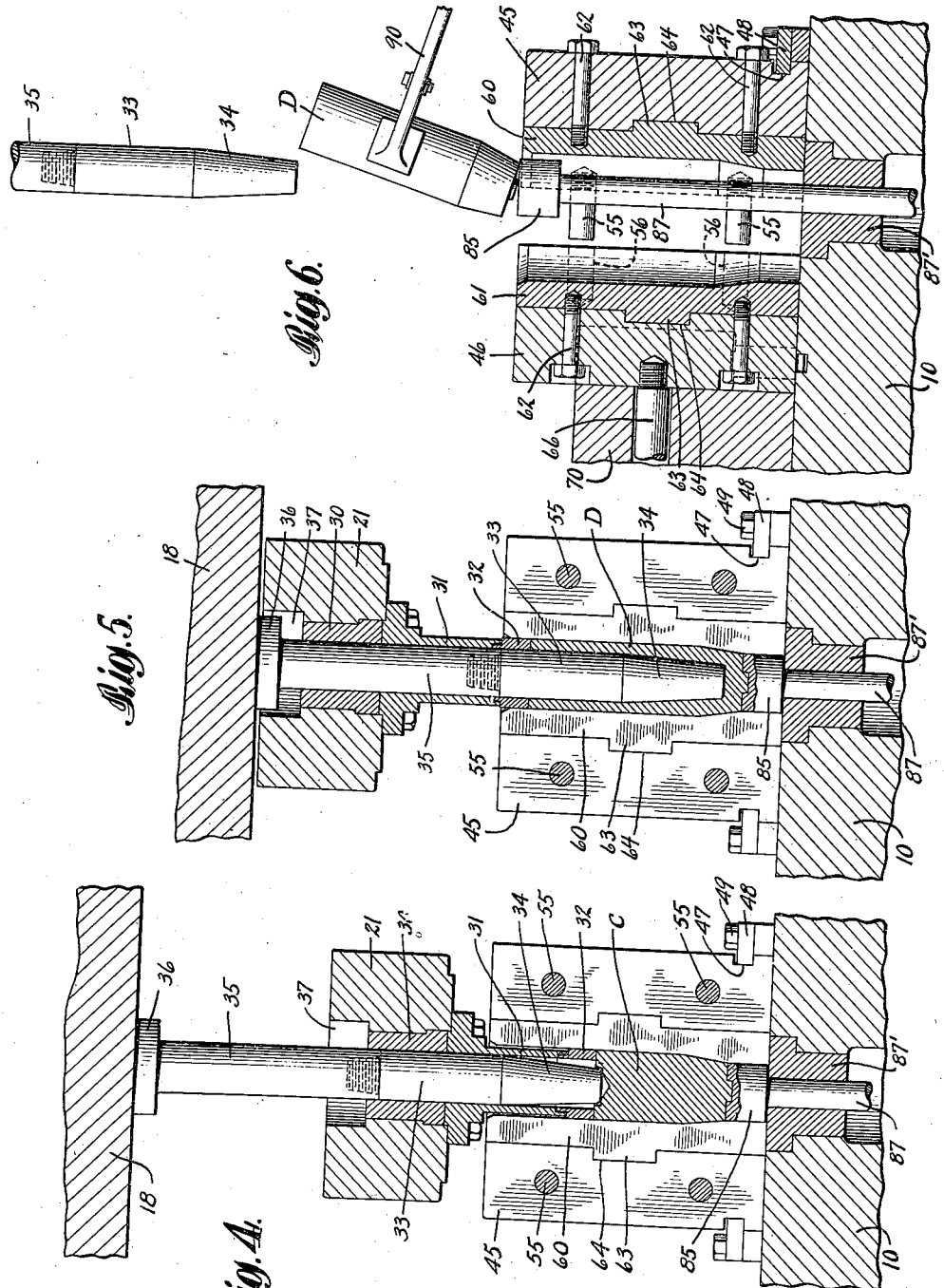
INVENTOR:
STANLEY W. SPARKS,
BY
His ATTORNEY.

Patented Nov. 4, 1941

2,261,304

UNITED STATES PATENT OFFICE 2,261,304

MANUFACTURE OF SHELLS FOR ORDNANCE PURPOSES

Stanley W. Sparks, Norwalk, Conn., assignor to Max H. Hoepli, New York, N. Y., as trustee Application February 25, 1939, Serial No. 258,525

14 Claims. (Cl. 207—9)

This invention relates to the extrusion of shells for ordnance purposes and has for its particular objects the expeditious and economical production of such shapes which are of concentric internal and external contour and wherein the wall is of worked metal and consequently unusually strong and free from laminations as well as other defects or flaws. Further objects of the invention comprise the provision of an extrusion apparatus wherein my novel method of extruding such shapes can be carried out.

I am well aware that ordnance shells have been heretofore produced from metal blanks by an extrusion operation but in all prior methods, so far as I am aware, there is a tendency for laminations to occur in the rear end or trailing end of the shell as it issues from the extrusion press and, furthermore, the production of a shell of substantially uniform concentricity and requiring but a minimum of machining to complete the finish of the extruded shape has been difficult, if not impossible to attain.

In the accompanying drawings in which I have illustrated a form of extrusion press in which my novel extrusion process can be performed, Figure 1 is a vertical section, partly in elevation of such an extrusion press;

Fig. 2 is a horizontal section taken on the line 2—2 of Fig. 1;

Fig. 3 is an enlarged, vertical section, partly in elevation, taken on the line 3—3 of Fig. 2;

Fig. 4 is an enlarged vertical section, partly in elevation, taken on the line 4—4 of Fig. 2, showing the parts of the press in the position assumed immediately prior to the commencement of the extrusion stroke of the press;

Fig. 5 is a view generally similar to Fig. 4 but showing the parts in a position assumed thereby at the completion of the extrusion stroke; and Fig. 6 is a fragmentary, detailed, vertical section, somewhat similar to that shown at the bottom of Fig. 1 but showing the knock-out plunger at its extreme upper position and the extruded shell forging about to be delivered from the press.

Referring to the drawings and the construction shown therein, the reference numeral 10 designates the stationary platen of my improved extrusion press, 11 the two lateral stanchions which include hollow terminal columns 12, said stanchions supporting the cylinder housing 13 in which the main cylinder 14 is rigidly secured. Said main cylinder is flanked by two draw-back cylinders 15 and tie rods 16 on which are threaded retaining nuts 17 which serve to lock said housing 13 in permanent alignment on the said stanchions 11.

A main cross-head 18 is adapted to slide on guideways 19 formed on the inner faces of said stanchions 11, said cross-head being carried by the main ram 20 that is slidably mounted in the main cylinder 14. A secondary cross-head 21 is secured by means of drawback rods 22 carried by the plungers of the drawback cylinders 15, the same being rigidly locked thereto by means of the nuts 23 which are positioned on the rods both above and below said secondary cross-head. As shown, said rods 22 slidably fit in guide holes 24 formed in the main cross-head. A central guide bushing 30 is fitted in the secondary cross-head and back pressure sleeve 31, having a removable back pressure tool 32 threaded into the lower end thereof, is bolted to the lower face of the latter cross-head, said sleeve having a removable tip or tool 32.

A forming tool 33 whose lower end 34 is tapered, being of truncated conical configuration of minimum cross section at the tip thereof, is threaded into the lower end of a forming tool shank 35. The latter has a flanged head 36 which loosely fits within a cavity 37 formed in the secondary cross-head above said bushing 30, said flanged head being, as shown, of slightly greater diameter than said bushing and being welded or otherwise rigidly secured to the main cross-head 18. An upsetting tool 40, having a split hub 41, is adapted to be clamped by a clamp nut 42 to the lower end of the forming tool 33 when said nut is threaded on said hub in the manner shown in Fig. 1.

The reference numeral 45 designates the fixed half of a split die which is rigidly secured to said platen 10 and 46 the other half of said die which is slidably mounted on said platen. A peripheral clamp groove 47 is formed in said die member 45, the same being adapted to receive clamp plates 48 which are secured by means of bolts 49 and an interposed spacing bar to the platen 10. Said fixed die member is secured to the platen 10 by main bolts 50 which project completely through said die member and the said member 45 is keyed to said platen by means of a key 51.

The sliding die member 46 is guided by said flanges 52 (see Fig. 2) which co-operate with guide plates 53 that are secured by bolts 54 to the platen 10. Pins 55, which are carried by the fixed die member 45, are adapted to project into registering holes 56 in the sliding die member 46 and maintain alignment between the two die members when the die is closed. Die liners 60 and 61 are secured by means of bolts 62 to the respective die members 45 and 46 and each of the die liners has a peripheral rib 63 formed thereon which, when said die liners are associated with the respective die members, is adapted to project into the grooves 64 formed on the inner faces of the die members and thereby effectively prevent relative movement between the liners and their associated die members during the extrusion.

The sliding die member 46 is reciprocated on the platen 10 by means of a cylinder 65, the piston 66 of which is threaded to said die member. A wedge 67, to the bottom of which is bolted a guide shoe 68 that slides in a guide groove 68' formed in the platen 10, serves to maintain a tight fit between the die members. Said wedge has a transverse slot 69 which receives said piston rod 66. A backing block 70 is secured by means of bolts 71 and a key 72 to the platen 10, the same serving both as a backing for the wedge as well as for a guide for the rod 66. A wedge-traversing cylinder 73, having a piston rod 74 carried by the plunger thereof, is mounted on said platen and the inner end of said piston rod projects into a recess 75 in said wedge. A shock plate 76 is bolted to said wedge and inner and outer lock nuts 77 and 78 respectively are threaded onto the end of said piston rod 74, the same serving, in cooperation with the shock plate 76, to effect to and fro movement of the wedge while at the same time admitting of a limited amount of lost motion.

A bottom die plug or ejector tool 85, which is carried on the upper end of an ejector piston rod 86, being retained thereon by the flanged head 87 of said rod, is normally positioned at the bottom of the bore of said liner 63, which bore generally conforms in configuration to the external configuration of the shell to be extruded. Said rod 86 is slidably fitted within a bushing 87' mounted in the platen. The reference numeral 88 designates a bayonet joint between the plug 85 and said head 87 of the ejector rod. Said ejector is reciprocated by an ejector cylinder 89. The blank, which is designated by the reference letter B, is introduced into the die by means of tongs 90. In Figs. 4 and 5 the reference letter C designates a blank which has been introduced into a die and initially upset prior to the main extrusion stroke and in Figs. 5 and 6 the reference letter D designates the extruded shell which results upon the completion of the main extrusion stroke of the press.

In the production of ordnance shells in the above described apparatus in accordance with my improved method of extrusion thereof, I preferably proceed as follows:

The movable die member 46 is traversed across the platen by means of the traversing cylinder 65 and its plunger, to which latter it is connected by the piston rod 66, until it assumes the position shown in Fig. 1. Thereupon the wedge 67, which is operated by the wedge traversing cylinder 73, is caused to project between the backing block 70 and said die member and to assume the position shown in Figs. 2 and 3 whereby it serves to tightly wedge the respective members of the die elements together. The mushing tool 40 is clamped to the tapered end 34 of the extrusion tool and the pressure block 85 is positioned in the bottom of the die by retracting the ejector rod 86 by means of the ejector cylinder 89. Thereupon the parts of the press being in the position shown in Fig. 1, a steel billet B, heated to a plastic condition, preferably in the case of high carbon steel to a temperature between 2250° F. and 2300° F. is then introduced by means of the tongs 90 into the bore of the closed die through the top thereof.

Following the introduction of the billet into the die, pressure is applied from the main ram 20 to the main cross-head 18 and the tool 33 and back-pressure sleeve 27 surrounding the same, together with the secondary cross-head 21, are caused to descend into the position shown in Fig. 4 and to thereby effect the upsetting of the blank until it completely fills the die below the tool 40 and assumes the form illustrated in Fig. 4. The said cross-heads 21 and 18 and the tool 33 carried thereby, are then retracted by means of the auxiliary drawback cylinders 15, until the same assumes the original position illustrated in Fig. 1, whereupon the mushing tool 40 is unclamped and removed from the extrusion tool. Immediately following such removal pressure is again applied to the cross-heads 18 and 21 from the main ram 20 and the tool 33 and likewise pressure is applied to the cross-head 21 from the auxiliary double-acting cylinders 15, to cause a separation of said cross-head from the main cross-head 18, so as to lower the same into the position shown in Fig. 4 wherein the same is in contact with the upper end of the die at the moment when the lower tapered end of the extrusion tool contacts with the preformed billet C. The main ram 20 is then caused to continue its descent until it attains the position shown in Fig. 5, such downward movement being limited by stop blocks or otherwise interposed between the top of the die and the secondary cross-head 21. During such downward movement of the tool 33, back pressure is applied from the auxiliary cylinders 15 to the cross-head 21 and to the sleeve 31 to cause the same to seal the top of the die while exerting even pressure on the plastic metal envelope extruded upwardly around the extrusion tool, whereby the tool is axially guided by such envelope, besides insuring that the wall of the extruded shell will be of homogeneous, even texture substantially free from laminations, blow holes or other defects. After the completion of the extrusion operation, the said sleeve 31 will have retracted, due to the excessive pressure of the extruded metal thereon as opposed to the pressure applied through the cylinders 15, into the position shown in Fig. 5.

Following the completion of the extrusion, the dies are separated, after first retracting the wedge 67 through the action of the wedge traversing cylinder 73, by traversing the movable die member 46 outwardly by means of the cylinder 65 until the parts assume the position shown in Fig. 6. Thereupon the shell is ejected by means of the ejector cylinder which is caused to suddenly project the ejector rod upwardly and to force the sudden engagement of the plug 85 with the closed end of the extruded shell D which will then be carried upwardly by said plug into the position shown in Fig. 6 whereupon it is then removed from the die by means of tongs 90 and the parts of the press are returned to their original position ready for another operation.

The preliminary mushing or upsetting of the billet, while preferably preformed in the same die in which the metal is to be extruded into the desired shell, may obviously be accomplished in a separate die, if desired. However such preforming of the billet or blank is important since it insures that the blank will be centered so that a portion thereof engages the recess in the top of the bottom plug 85 while the top of the blank will be provided with a recess adapted to receive the lower portion of the tapered end 34 of the extrusion tool.

The employment of the back pressure sleeve is of the utmost importance in accomplishing the extrusion of ordnance shells, since the same not only effectively prevents the spurting or escape of the metal from the die externally of the forming tool 33, which is of considerably smaller diameter than the bore of the die, but as above explained it serves to exert a predetermined, even counter-pressure upon the upwardly flowing metal envelope with which it is in contact from the moment that the extrusion operation commences until the completion thereof, thus insuring the axial guiding of the extrusion tool and production of a shell whose inner and outer walls are accurately concentric besides having the other characteristics above stated.

The traversing wedge 67 and the wedge block 70, together with the wedge traversing cylinder 73, serve to effectively lock the component halves of the die together while at the same time admitting of their quick separation when desired, thereby enabling the parts of the press to be rapidly brought into position for another operation following the completion of a prior extrusion. Likewise, the provision of the bottom plug 85 which is actuated by the ejector cylinder 89, serves to not only seal the bottom of the die and center the blank within the die but to crack the extruded shell loose from the die at the completion of the extrusion operation.

The extruded shell obtained by practicing my improved method of extrusion is of remarkable tensile strength besides being unusually concentric and possessing the other characteristics hereinbefore specified. Furthermore, due to saving in labor effected and to the rapidity of the production thereof by such method shells can be produced at a substantially lower cost than shells produced in accordance with present practice.

Heretofore in the extrusion of ordnance shells, it has been customary to employ a one-piece liner and during the ejection of the shells so produced, owing to the seizure of the same by the liner, severe erosive action occurs on the external surface of the shell. By the employment of the split-die mechanism herein described, wherein a two-piece liner is employed, it is possible to first separate the die members from each other, thereby reducing the grip on the extruded shape and permitting of it being readily ejected from the separated die with but a negligible amount of erosion of the external wall thereof.

The back pressure can be directly applied to sleeve by the water pressure in the cylinder or as is preferable by retarding or throttling the escape on the water from said cylinder during the returned or upward movement of the sleeve.

My improved apparatus is ideally adapted for carrying out the aforesaid shell extrusion operation besides being relatively inexpensive to construction, unusually sturdy and highly efficient in operation.

Various modifications of the within described apparatus and method of extrusion of ordnance shells may be made without departing from the spirit of my invention as embraced within the scope of the appended claims.

Having thus described my invention, what I claim and desire to obtain by United States Letters Patent is:

1. In a shell extrusion press, the combination comprising a bed element, lateral stanchions and a transverse cap-piece supported thereon, a two-piece die mounted on said bed, one of the members of said die being rigidly secured thereto and the other member being transversely slidable thereon, means for traversing said movable die member on the bed, means for locking said die members together, a main hydraulic power cylinder supported by said cap-piece, a ram slidably mounted in said cylinder, a main platen slidably mounted on said stanchions and attached to said ram, a supplemental platen also slidably mounted on said stanchions and interposed between said main ram and said bed, a hollow sleeve-like tool carried by said latter platen, an extrusion tool telescoping within said hollow tool and secured to said main platen, auxiliary double-acting cylinders for advancing said supplemental platen independently of said main platen and for retracting both platens.

2. In a shell extrusion press, the sub-combination comprising a main extrusion ram, a slidably mounted main platen secured to said ram and movable therewith, a slidable supplementary platen, means for moving the latter independently of said main platen, a sleeve-like tool carried by the supplementary platen, an extrusion tool carried by the main platen and telescoping within said supplementary platen and means for advancing said extrusion tool while said sleeve-like tool is retracting from said bed.

3. In a shell extrusion press, the sub-combination comprising a bed member, a two-piece die member mounted thereon, one of whose members is slidable relative to said bed, means for traversing the slidable die member, a stationary pressure block mounted adjacent the outer lateral face of said slidable die member, a wedge member adapted to be projected between said pressure block and said movable die member, guide means on said bed for guiding said pressure block in a path intersecting the path of movement of said slidable die member and means for traversing said movable die member across said bed and separate means for traversing said wedge along said guide means.

4. In a shell extrusion press, the sub-combination comprising a split die, at least one of whose members is slidable, an ejector element adapted to serve as a sealing plug for the inner end of the die when the latter is closed, means on said ejector for centering a plastic metal blank when introduced into the die and expanded so as to contact with diametrically opposite portions thereof and means for traversing said ejector plug throughout the die member to eject the extruded shape upon the opening of said die.

5. In a shell extrusion press, the sub-combination comprising a main, movable platen, an extrusion tool carried thereby, a supplementary slidable platen associated with the main platen but moving independently thereof, a sleeve-like tool carried by said supplementary platen and normally enveloping said extrusion tool, a removable tip for said extrusion tool which is of greater cross-sectional area than the end of said tool and means for removably securing same to said tool.

6. In a shell extrusion press, the sub-combination comprising a movable main platen, a movable supplementary platen, an extrusion tool carried by the main platen and which tool projects through said supplementary platen, a sleeve-like tool carried by said supplementary platen and normally enveloping said extrusion tool, a hydraulic ram member connected to said main platen and means for effecting independent movement of said supplementary platen with respect to the main platen.

7. In a shell extrusion press, the combination comprising a bed element, lateral stanchions projecting therefrom and supported thereby, a cap-piece rigidly securing said stanchions together at their outer ends, a main hydraulic power cylinder supported by said cap-piece, supplementary hydraulic cylinders flanking said main cylinder and also supported by said cap-piece, a main hydraulic ram operatively mounted in said main cylinder and supplementary hydraulic rams operatively mounted in said supplementary cylinders, a slidable main platen carried by said main ram, a slidable supplementary platen carried by said supplementary rams, an extrusion tool carried by said main platen and a sleeve-like tool carried by said supplementary platen and normally enveloping said main tool.

8. In a shell extrusion press, the sub-combination comprising a bed element, a two-piece die supported thereon, one of said die members being transversely slidable thereon, a slidable wedge member for wedging together said members when the same are in a closed position, means for traversing said movable die member transversely of said bed and means for traversing said wedge member along a path intersecting the path of travel of said movable die member.

9. In a shell extrusion press, the sub-combination comprising a bed member, a split die mounted thereon one of whose members is slidable relative to said bed, a stationary, transversely slotted pressure block mounted adjacent the movable die member, a slidable wedge member, a guide track on which said wedge is mounted, said track intersecting the path of travel of said movable die member, hydraulic means including a piston and connecting rod for traversing said movable die member, said connecting rod extending through the slot in said wedge and means for traversing said wedge on its track.

10. In a shell extrusion press, the combination comprising a bed element, lateral stanchions projecting therefrom and supported thereby, a cap-piece rigidly securing said stanchions together at their outer ends, a main hydraulic power cylinder supported by said cap-piece, supplementary hydraulic cylinders flanking said main cylinder and also supported by said cap-piece, a main hydraulic ram operatively mounted in said main cylinder and supplementary hydraulic rams operatively mounted in said supplementary cylinders, a slidable main platen carried by said main ram, a slidable supplementary platen carried by said supplementary rams, an extrusion tool carried by said main platen and a sleeve-like tool carried by said supplementary platen and normally enveloping said main tool, said tool being of an area and configuration to have a snug sliding fit with the bore of said die when projected thereinto.

11. In a shell extrusion press, the sub-combination comprising an extrusion tool having a tapered forming end and a removable tip enveloping the extreme end of said tool and rigidly secured thereto, said tip being of a configuration and cross-section corresponding substantially to the maximum cross-section of the shell to be extruded.

12. In a shell extrusion press, the sub-combination comprising a removable tip for attachment to an extrusion tool having a tapered outer end, said tip comprising a head of a configuration and cross-section corresponding to the maximum cross-section of the desired extruded shell and said head having an externally threaded internally tapered split sleeve projecting therefrom and connected thereto and an internally threaded cooperating nut which is of an internal configuration to effect the wedging of said sleeve onto the tapered end of the extrusion tool when tightly screwed onto said sleeve.

13. In a shell extrusion apparatus, the combination comprising a bed member and supporting stanchions and a two-piece die mounted thereon, a reciprocatable extrusion ram so mounted that its longitudinal axis is in alinement with the center of the die when the latter is closed, a main platen guiding said ram and slidably mounted on said stanchions, a supplemental platen also slidably mounted on said stanchions and positioned between said main platen and said die, a guide sleeve carried by said supplemental platen, an extrusion tool enveloped by said guide sleeve and secured to said main platen and double-acting power cylinders for advancing said supplemental platen independently of said main platen and for simultaneously retracting both platens and a power cylinder for advancing said ram toward and into said die.

14. The method of extruding shells, which comprises subjecting a mass of plastic metal of a cubical content at least equal to that of the desired shell and of an external configuration conforming generally to that of the shell desired, while heated to an extrusion temperature and while confined against lateral expansion, to sufficient endwise pressure from a floating plunger element, to effect the invert longitudinal extrusion of the metal in the form of a hollow cylinder while continually exerting a sufficient counter-pressure upon the end of the cylinder during its formation to maintain the plunger element axially within said cylinder and thereby insure accurate concentricity of the inner and outer walls of the resultant extruded shell.

STANLEY W. SPARKS.